(12) United States Patent
Tamada

(10) Patent No.: US 8,443,950 B2
(45) Date of Patent: May 21, 2013

(54) SHOCK ABSORBER FOR VEHICLE

(75) Inventor: Teruo Tamada, Tokyo (JP)

(73) Assignee: Kyoraku Co., Ltd., Kyoto-shi, Kyoto (JP)

( * ) Notice: Subject to any disclaimer, the term of this patent is extended or adjusted under 35 U.S.C. 154(b) by 395 days.

(21) Appl. No.: 12/449,840

(22) PCT Filed: Feb. 28, 2008

(86) PCT No.: PCT/JP2008/053576
§ 371 (c)(1),
(2), (4) Date: Jan. 22, 2010

(87) PCT Pub. No.: WO2008/105517
PCT Pub. Date: Sep. 4, 2008

(65) Prior Publication Data
US 2010/0140032 A1 Jun. 10, 2010

(30) Foreign Application Priority Data

Feb. 28, 2007 (JP) ................. 2007-050400

(51) Int. Cl.
*F16F 7/12* (2006.01)
*B60R 19/20* (2006.01)
(52) U.S. Cl.
CPC .. *F16F 7/12* (2013.01); *B60R 19/20* (2013.01)
USPC ............ 188/371; 188/377; 293/107; 293/120
(58) Field of Classification Search
USPC ........... 188/371, 376, 377; 267/139; 293/133, 293/107, 120–122
See application file for complete search history.

(56) References Cited

U.S. PATENT DOCUMENTS 4,227,593 A * 10/1980 Bricmont et al. ............ 188/377
6,179,355 B1 * 1/2001 Chou et al. .................... 293/132
(Continued)

FOREIGN PATENT DOCUMENTS

| JP | 2002-187508 | 7/2002 |
| JP | 2004-314647 | 11/2004 |
| JP | 2006-130936 | 5/2006 |

OTHER PUBLICATIONS

English translation of International Preliminary Report and Written Opinion.

*Primary Examiner* — Robert A Siconolfi
*Assistant Examiner* — Stephen Bowes
(74) *Attorney, Agent, or Firm* — Flynn, Thiel, Boutell & Tanis, P.C.

(57) ABSTRACT

[PROBLEMS] An impact absorption body for a vehicle can have desired impact absorption performance, exhibits excellent impact absorption performance particularly immediately after an impact is applied to the body, and can maintain high impact absorption performance. [MEANS FOR SOLVING PROBLEMS] The impact absorption body (1) for a vehicle is installed within a vehicle forming member and absorbs impact energy in a collision. The impact absorption body (1) has a first wall (4) placed on the side that receives an impact, a second wall (5) facing the first wall (4) with a hollow section (2) between them, and one or more impact absorption ribs (9) constructed from deep groove sections (15) and shallow groove sections (16). The deep groove sections (15) are formed by depressing the first wall (4) and second wall (5) into groove shapes and integrally joining the top surfaces, which function as fusion bonding surfaces, of the depressions. The shallow groove sections (16) are formed by causing the top surfaces of the depressions to face each other with gaps between them.

5 Claims, 4 Drawing Sheets

U.S. PATENT DOCUMENTS

| | | | |
|---|---|---|---|
| 6,406,079 B2 * | 6/2002 | Tamada et al. | 293/120 |
| 6,971,691 B1 * | 12/2005 | Heatherington et al. | 293/102 |
| 7,111,713 B2 * | 9/2006 | Tamada et al. | 188/371 |
| 7,370,893 B2 * | 5/2008 | Tamada et al. | 293/120 |
| 2004/0195064 A1 | 10/2004 | Tamada et al. | |
| 2005/0213478 A1 * | 9/2005 | Glasgow et al. | 369/262 |

* cited by examiner ced rib is formed from the second wall to the first wall of the hollow double-wall structure and welded to the first wall, a shock absorber for a vehicle so adapted that a pair of recessed ribs is formed from a first wall and a second wall of a hollow double-wall structure and is welded within a hollow portion, and a blow molded energy absorber for a front end of a vehicle having an integral structure, serving as a hollow double-wall structure, including a forward projection and a backward portion attached to the vehicle.

SHOCK ABSORBER FOR VEHICLE

TECHNICAL FIELD

The present invention relates to a shock absorber for a vehicle for absorbing a shock applied when a vehicle occupant or a pedestrian collides with a vehicle constituent member, for example, a roof panel, a pillar, or a bumper (particularly, a bumper fascia) by being internally provided in the vehicle constituent member.

BACKGROUND ART

Patent Document 1, Patent Document 2, and Patent Document 3 respectively discuss a shock absorber for a vehicle, assembled into bumper beams respectively disposed on a front face or a rear face of a vehicle body of the vehicle and deformed by a shock applied when the vehicle collides with an object having a low rigidity to cushion a shock exerted on the object, so adapted that a concavely curved supporting wall is formed from a second wall to a first wall of a hollow double-wall structure and welded to the first wall, a shock absorber for a vehicle so adapted that a pair of recessed ribs is formed from a first wall and a second wall of a hollow double-wall structure and is welded within a hollow portion, and a blow molded energy absorber for a front end of a vehicle having an integral structure, serving as a hollow double-wall structure, including a forward projection and a backward portion attached to the vehicle.

Patent Document 1: Japanese Patent Application Laid-Open No. 2004-114864
Patent Document 2: Japanese Patent Application Laid-Open No. 2006-151250
Patent Document 3: Japanese Patent Application Laid-Open No. 2006-519730

DISCLOSURE OF THE INVENTION

Problems to be Solved by the Invention

In the shock absorbers for vehicles discussed in Patent Document 1 and Patent Document 2, respectively, so adapted that the recessed rib is formed from the second wall to the first wall of the hollow double-wall structure composed of thermoplastic resin and its front end is joined to the first wall and so adapted that the recessed ribs are respectively formed from the first wall and the second wall and their respective front ends are jointed to and integrated with each other, a required amount of shock absorption can be ensured if the shock absorber for a vehicle has a sufficient thickness, while a required amount of shock absorption cannot be obtained if the shock absorber for a vehicle has a limited thickness, particularly requiring an improvement in shock absorption performance immediately after application of a shock.

The present invention is directed to providing a shock absorber for a vehicle including a first wall that is subjected to a shock, a second wall spaced apart from and opposed to the first wall, a peripheral wall connecting the first wall and the second wall, to form a hollow portion, and one or two or more shock absorption ribs each including a deep groove having a welding surface formed therein by respectively depressing the first wall and the second wall into recessed groove shapes and integrally joining their respective front end surfaces to each other and a shallow groove formed by opposing the front end surfaces with a distance apart from each other. This enables the shock absorber for a vehicle to have required shock absorption performance while being superior in the shock absorption performance particularly immediately after application of a shock and keeping the shock absorption performance high, and can prevent a difference from occurring in characteristics in the shock absorption performance depending on a contact position, even when used for applications for protecting the head or the leg of a vehicle occupant or a pedestrian to exhibit stable shock absorption.

Means for Solving the Problems

In order to attain the above-mentioned object, a shock absorber for a vehicle according to the present invention is a shock absorber for a vehicle for absorbing shock energy at the time of collision by being internally provided in a vehicle constituent member, characterized by including a first wall that is subjected to a shock, a second wall spaced apart from and opposed to the first wall, a peripheral wall connecting the first wall and the second wall, to form a hollow portion, and one or two or more shock absorption ribs each including a deep groove having a welding surface formed therein by respectively depressing the first wall and the second wall into recessed groove shapes and integrally joining their respective front end surfaces to each other and a shallow groove formed by opposing the front end surfaces with a distance f apart from each other, in which the average value of the distance f in the shallow groove is in a range of 0.3 to 0.8 times the average value of a distance D between the first wall and the second wall.

In order to attain the above-mentioned object, the shock absorber for a vehicle of the present invention is characterized in that the peripheral wall connecting the first wall and the second wall has a plurality of recesses formed by depressing its parts.

In order to attain the above-mentioned object, the shock absorber for a vehicle according to the present invention is characterized in that the shock absorption rib has a symmetric structure on the welding surface, and the welding surface has a predetermined width in a range of 5 to 40 mm.

In order to attain the above-mentioned object, the shock absorber for a vehicle of the present invention is characterized in that the average value of the distance D between the first wall and the second wall is in a range of 40 to 150 mm.

In order to attain the above-mentioned object, the shock absorber for a vehicle of the present invention is characterized in that the shock absorption ribs are spaced a distance b (mm), which is 0.6 to 1.4 times a distance a (mm) between the first wall and the welding surface, apart from one another.

Effects of the Invention

A shock absorber for a vehicle according to the present invention includes a first wall that is subjected to a shock, a second wall spaced apart from and opposed to the first wall, a peripheral wall connecting the first wall and the second wall, to form a hollow portion, and one or more shock absorption ribs, each including a deep groove having a welding surface formed therein by respectively depressing the first wall and the second wall into recessed groove shapes and integrally joining their respective front end surfaces to each other and a shallow groove formed by opposing the front end surface with a distance apart from each other, thereby producing the effects of having required shock absorption performance while being superior in the shock absorption performance particularly immediately after application of a shock and keeping the shock absorption performance high, and preventing a difference from occurring in characteristics in the shock absorption performance depending on a contact position even when used for applications for protecting the head or the leg of a vehicle occupant or a pedestrian to exhibit stable shock absorption.

Figure 1:
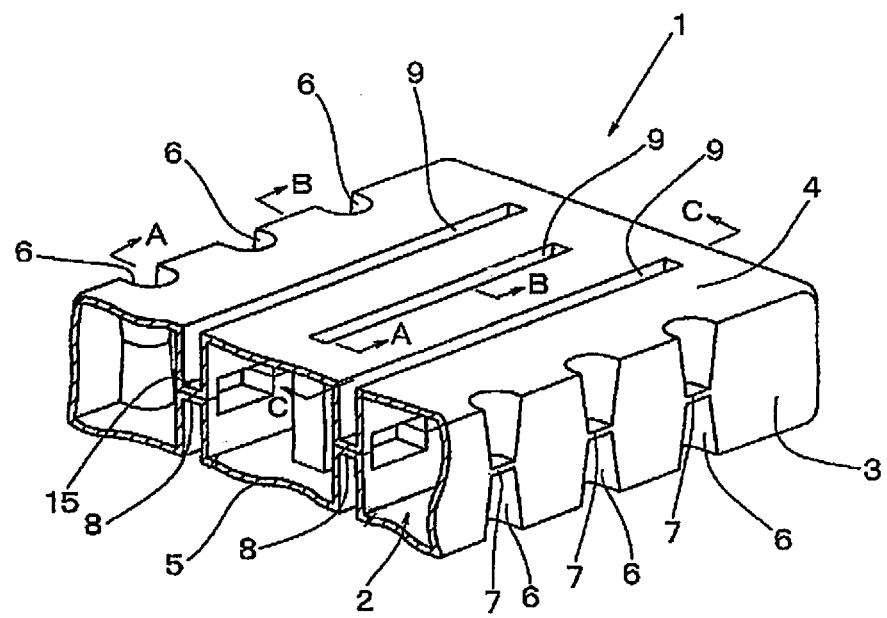
FIG. 1 is a partially broken perspective view illustrating a shock absorber for a vehicle according to an embodiment of the present invention.
Figure 2:
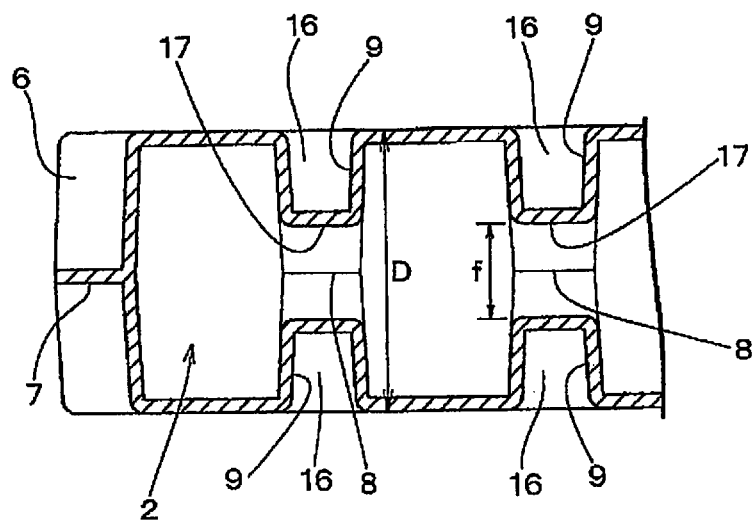
FIG. 2 is a cross-sectional view taken along a line A-A illustrated in FIG. 1.
Figure 3:
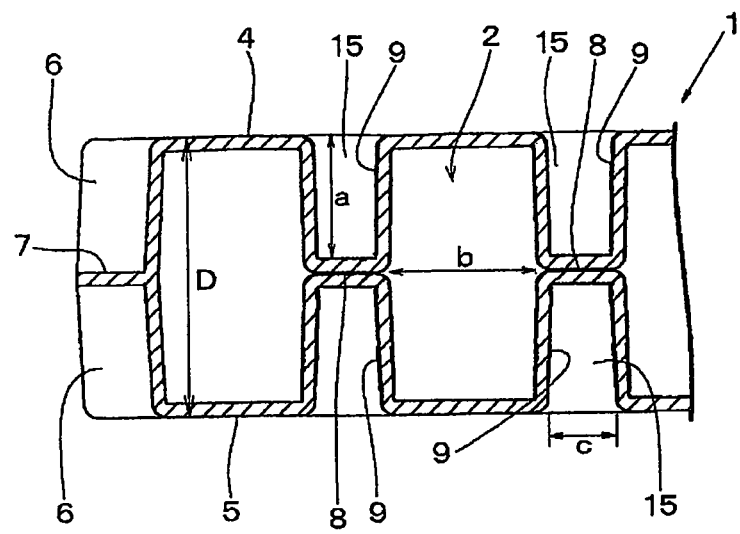
FIG. 3 is a cross-sectional view taken along a line B-B illustrated in FIG. 1.

DESCRIPTION OF SYMBOLS
1 SHOCK ABSORBER FOR VEHICLE
2 HOLLOW PORTION
3 PERIPHERAL WALL
4 FIRST WALL
5 SECOND WALL
6 RECESS
7 WELDING PORTION
8 WELDING SURFACE
9 SHOCK ABSORPTION RIB
10 AUTOMOTIVE ROOF PANEL
11 BUMPER
12 HEAD OF VEHICLE OCCUPANT
13 BUMPER BEAM
14 BUMPER FASCIA
15 DEEP GROOVE
16 SHALLOW GROOVE
17 FRONT END SURFACE OF SHALLOW GROOVE

Best Mode for Carrying Out the Invention

In FIGS. 1 to 4, a shock absorber for a vehicle 1 is formed in a hollow shape by blow molding thermoplastics, and includes a hollow portion 2, a peripheral wall 3, a first wall 4, and a second wall 5. The first wall 4 is subjected to a shock.

The shock absorber for a vehicle 1 includes the first wall 4 that is subjected to a shock and the second wall 5 spaced apart from and opposed to the first wall 4 with the hollow portion 2 interposed therebetween, as described above. The peripheral wall 3 connects the first wall 4 and the second wall 5. The peripheral wall 3 has a plurality of recesses 6 formed by depressing its parts. Each of the recesses 6 includes a welding portion 7. There are provided a plurality of shock absorption ribs 9 each including a welding surface 8 formed by respectively depressing the first wall 4 and the second wall 5 into recessed groove shapes and integrally joining their respective front end surfaces to each other.

The shock absorption rib 9 includes a deep groove 15 having the welding surface 8 formed therein by respectively depressing the first wall 4 and the second wall 5 into recessed groove shapes and integrally joining their respective front end surfaces at positions substantially intermediate between the first wall 4 and second wall 5 and a shallow groove 16 formed by opposing the front end surfaces with a distance f apart from each other. The average value of the distance f in the shallow groove 16 is in a range of 0.3 to 0.8 (preferably 0.55 to 0.7) times the average value of a distance D between the first wall 4 and the second wall 5. This configuration causes the shock absorption rib 9 to be deformed and crushed while maintaining a predetermined reaction force against a load at the time of collision, and consume energy corresponding to a load stress and an amount of displacement at that time to absorb a shock.

The shock absorption rib 9 has a symmetric structure on the welding surface 8. The welding surface 8 has a predetermined width in a range of 5 to 40 mm. The average value of the distance D between the first wall 4 and the second wall 5 is in a range of 40 to 150 mm, and a distance a between the first wall 4 and the welding surface 8 is 20 to 75 mm. If the plurality of shock absorption ribs 9 is provided, the shock absorption ribs 9 are spaced a distance b (mm) apart from and parallel to one another, and the distance b is 0.6 to 1.4 times the distance a (mm). The width c of the welding surface 8 is 5 to 40 mm. The length e of the shallow groove 16 is 20 to 80 mm (preferably 40 to 60 mm). Even if the length e of the shallow groove 16 is too small or too large, the shock absorption performance of the shock absorber for a vehicle 1 is reduced. If the shallow groove 16 is too long, the shock absorption performance is reduced (by not less than −15% of an initial load). If the shallow groove 16 is too short, both sidewall surfaces thereof may weld together, resulting in inferior molding. The average value of the distance f in the shallow groove 16 between the first wall 4 and the second wall 5 is 0.3 to 0.8 (preferably 0.55 to 0.7) times the distance D. When the average value of the distance f exceeds 0.8 times the distance D, a reaction force immediately after application of a shock becomes excessive for shock absorption in the shallow groove 16. If the average value of the distance f is less than 0.3 times the distance D, deflection and deformation in the direction in which the shock absorption rib 9 is opened cannot be restrained. Particularly when the shock is applied in a direction diagonal to the shock absorption rib 9, the shock absorption performance is significantly reduced. If the shallow groove 16 does not exist, only the deep groove exists. Therefore, the deflection and deformation in the direction in which the shock absorption rib 9 is opened around the welding portion 7 cannot be restrained, resulting in further reduction in the shock absorption performance.

Figure 7:
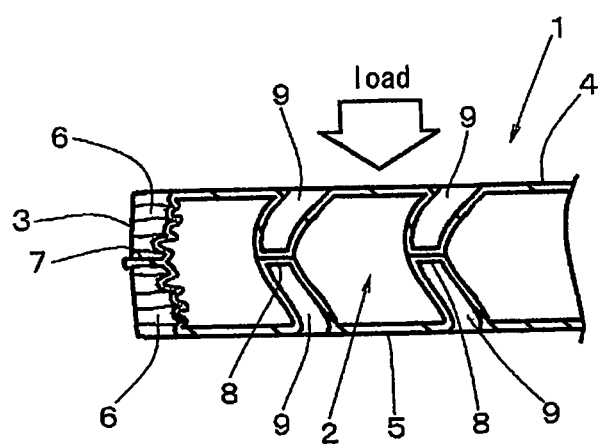
FIG. 7 is a cross-sectional view for describing the function of the shock absorber for a vehicle according to the present invention.

In the shock absorber for a vehicle 1 according to the present invention, when a shock is applied to the first wall 4, the first wall 4 and the second wall 5 are deflected toward the peripheral wall 3 from a part of the shock absorption rib 9 due to its load, and the shock is absorbed by the plurality of recesses 6 formed in the peripheral wall 3. Therefore, a compressive load is increased immediately after the shock is applied so that the shock absorption performance is significantly improved (see FIG. 7).

Figure 4:
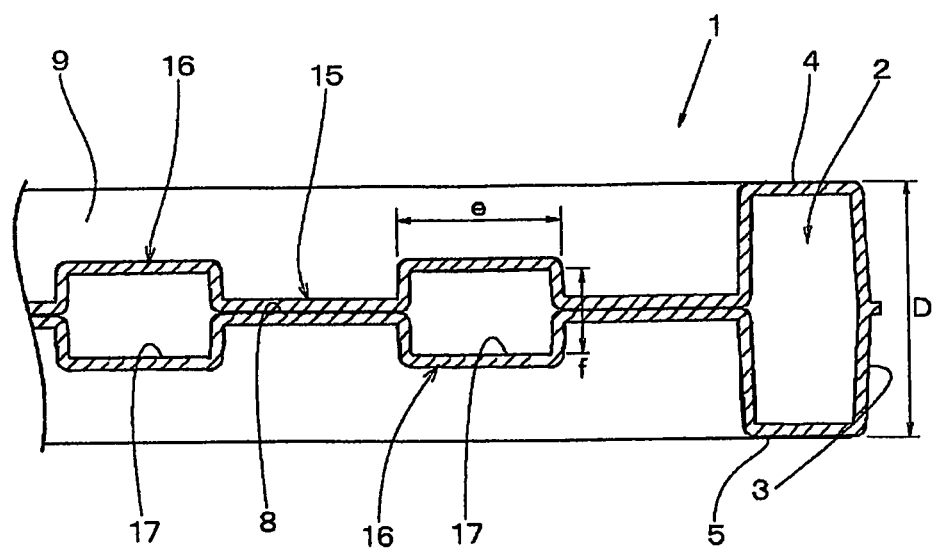
FIG. 4 is a cross-sectional view taken along a line C-C illustrated in FIG. 1.

The average value of the distance D between the first wall 4 and the second wall 5 and the average value of the distance f in the shallow groove 16 therebetween are found in the following manner. The average value of the distance D between the first wall 4 and the second wall 5 is calculated by measuring the distance D at each of five points at which the length of the shock absorber for a vehicle 1 is divided into six equal parts based on the center and both final ends thereof. Furthermore, the average value of the distance f in the shallow groove 16 is calculated by measuring the distance f at each of five points at which the length (e) of the shallow groove 16 corresponding to an area between ends of the welding surface 8 of the deep groove 15 is divided into six equal parts. Although description has been made of a case where the cross-sectional shape along the length of the front end surface of the shallow groove 16 is a square shape that is a combination of U shapes in cross section facing each other, as illustrated in FIG. 4. In addition thereto, the shape may be a circular shape that is a combination of circular-arc shapes in cross section facing each other or a rhomboid shape that is a combination of V shapes in cross section facing each other.

The shock absorber for a vehicle 1 according to the present invention is composed of a resin having a mechanical strength such as rigidity, for example, polyolefin resins such as polyethylene or polypropylene, styrene resins such as polystyrene or ABS (acrylonitrile-butadiene-styrene) resins, polyester resins such as polyethylene terephthalate, polyamides, and their mixtures.

Figure 5:
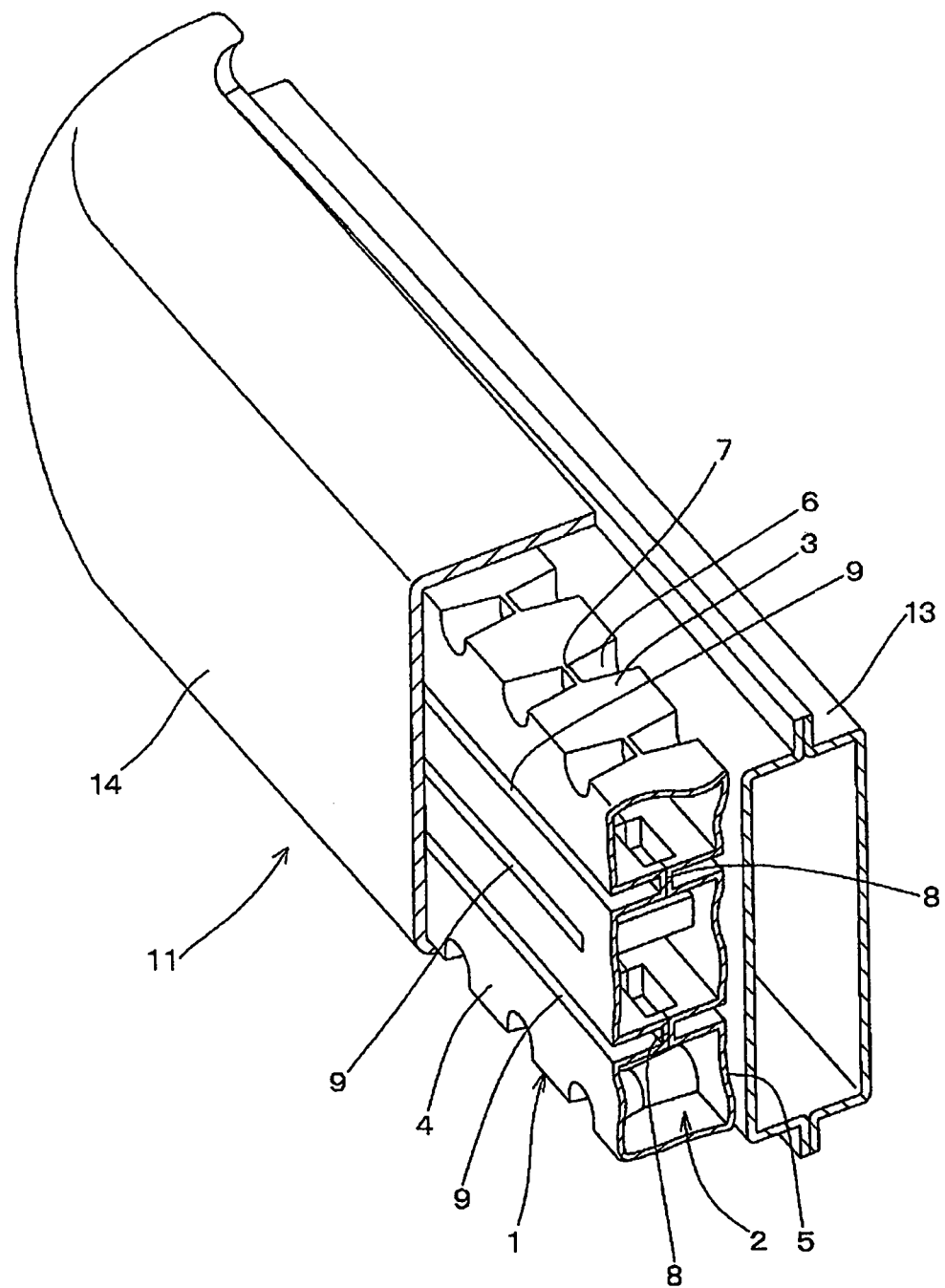
FIG. 5 is a partial perspective view of a bumper having the shock absorber for a vehicle according to the present invention internally provided therein.
Figure 6:
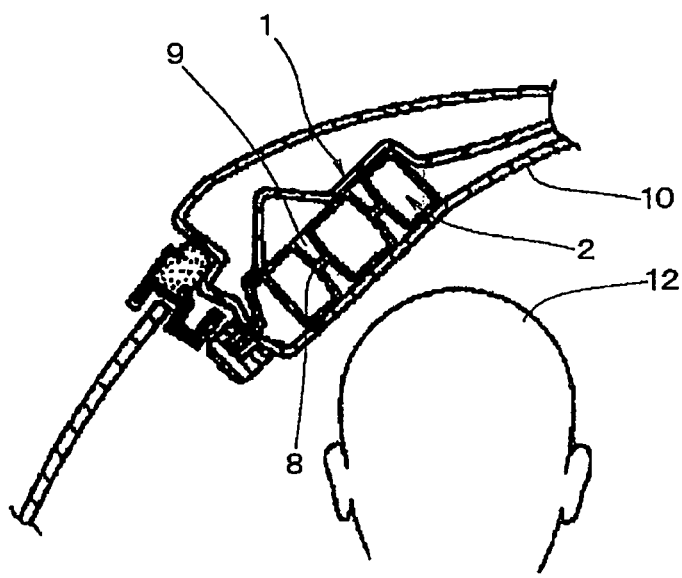
FIG. 6 is a cross-sectional view illustrating a form in which the shock absorber for a vehicle according to the present invention is internally provided in an automotive roof panel.

FIGS. 5 and 6 respectively illustrate forms in which the shock absorber for a vehicle 1 according to the present invention is internally provided in an automotive bumper 11 and an automotive roof panel 10. In FIG. 5, the bumper 11 includes a bumper beam 13 and a bumper fascia 14. In FIG. 6, the head 12 of a vehicle occupant is illustrated.

The shock absorber for a vehicle 1 according to the present invention is internally provided such that the first wall 4 is arranged on the side of the vehicle constituent member. At least a part of the first wall 4 may be abutted against the vehicle constituent member and screwed thereinto with a fixing member (not shown) provided in the shock absorber for a vehicle 1 sandwiched therebetween. This enables a shock applied when the leg of a pedestrian comes into contact with the exterior vehicle constituent member such as the bumper fascia 14 at the time of collision of the vehicle and further when the head 12 of a vehicle occupant comes into contact with the interior vehicle constituent member such as the roof panel 10 to be absorbed by crushing the shock absorber for a vehicle 1.

The shock absorber for a vehicle 1 according to the present invention is internally provided in the vehicle constituent members, for example, a door, a door trim, a body side panel, a roof panel, a headliner, a pillar, and a bumper of an automobile or the like so that the shock absorption of each of the members can be significantly enhanced. This greatly contributes to an improvement in the safety of the automobile.

The invention claimed is:

1. A shock absorber for a vehicle for absorbing shock energy at the time of collision by being internally provided in a vehicle constituent member, the shock absorber for a vehicle comprising:

a first wall that is subjected to a shock;

a second wall spaced apart from and opposed to the first wall; and a peripheral wall connecting the first wall and the second wall, to form a hollow portion, wherein the first wall and the second wall are each provided with a plurality of shock absorption ribs spaced a distance apart from and parallel to one another, wherein the shock absorption ribs each have a deep elongated groove having a welding surface formed therein by respectively depressing the first wall and the second wall into recessed groove shapes and integrally joining the respective front end surfaces of recessed grooves formed in the first wall and in the second wall to each other and a shallow elongated groove formed by opposing the front end surfaces with a distance (f) apart from each other, the deep elongated groove and the shallow elongated groove being alternately formed to form a symmetrical structure on the welding surface, and the average value of the distance (f) in the shallow elongated groove is in a range of 0.3 to 0.8 times the average value of a distance (D) between the first wall and the second wall.

2. The shock absorber for a vehicle according to claim 1, wherein the peripheral wall connecting the first wall and the second wall has a plurality of recesses.

3. The shock absorber for a vehicle according to claim 1, wherein the welding surface has a predetermined width in a range of 5 to 40 mm.

4. The shock absorber for a vehicle according to claim 1, wherein the average value of the distance D between the first wall and the second wall is in a range of 40 to 150 mm.

5. The shock absorber for a vehicle according to claim 1, wherein the shock absorption ribs are spaced a distance b (mm), which is 0.6 to 1.4 times a distance a (mm) between the first wall and the welding surface, apart from one another.

* * * * *